United States Patent
Roimela et al.

(10) Patent No.: US 10,600,153 B2
(45) Date of Patent: Mar. 24, 2020

(54) VIDEO STREAMING METHOD

(71) Applicant: Nokia Technologies Oy, Espoo (FI)

(72) Inventors: Kimmo Roimela, Tampere (FI); Yu You, Kangasala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/057,397

(22) Filed: Mar. 1, 2016

(65) Prior Publication Data
US 2016/0260196 A1 Sep. 8, 2016

(30) Foreign Application Priority Data
Mar. 5, 2015 (GB) .................................. 1503682.5

(51) Int. Cl.
*G06T 3/40* (2006.01)
*G06F 3/01* (2006.01)
(Continued)

(52) U.S. Cl.
CPC ............ *G06T 3/40* (2013.01); *G02B 27/0172* (2013.01); *G06F 3/012* (2013.01); *G06F 3/013* (2013.01); *G06K 9/52* (2013.01); *G06K 9/6262* (2013.01); *G06T 11/60* (2013.01); *G09G 3/2096* (2013.01); *H04N 5/23238* (2013.01); *H04N 21/234363* (2013.01); *G02B 2027/0147* (2013.01); *G06K 2009/4666* (2013.01);
(Continued)

(58) Field of Classification Search
CPC .. G09G 3/20; G06T 3/40; G06T 11/60; G06T 7/00; G06K 9/52; G06K 9/62; G06F 3/01; G02B 27/01

USPC ......................................................... 345/660
See application file for complete search history.

(56) References Cited

U.S. PATENT DOCUMENTS

| 4,513,317 A | 4/1985 | Ruoff, Jr. |
| 2002/0057279 A1 | 5/2002 | Jouppi |

(Continued)

FOREIGN PATENT DOCUMENTS

| JP | H08-289179 | 11/1996 |
| JP | H09-009253 | 1/1997 |

(Continued)

OTHER PUBLICATIONS

"3rd Generation Partnership Project; Technical Specification Group Services and System Aspects; Transparent end-to-end Packet-switched Streaming Service (PSS); Real-time Transport Protocol (RTP) usage model (Release 12)", 3GPP TR 26.937, V12.0.0, Sep. 2014, pp. 1-44.

(Continued)

*Primary Examiner* — Michael Le
(74) *Attorney, Agent, or Firm* — Alston & Bird LLP (57) ABSTRACT

The invention relates to a video streaming method, comprising receiving a panoramic video; receiving head-tracking data; determining a current field of view based on the head-tracking data. The resolution of the panoramic video may be adjusted based on the current field of view, wherein resolution of the current field of view is a first resolution and the resolution outside of the current field of view is a second resolution. The panoramic video with adjusted resolution may be provided, wherein the first resolution is higher than the second resolution.

18 Claims, 6 Drawing Sheets

(51) Int. Cl.
*G02B 27/01* (2006.01)
*G06K 9/52* (2006.01)
*G06K 9/62* (2006.01)
*G09G 3/20* (2006.01)
*G06T 11/60* (2006.01)
*H04N 21/2343* (2011.01)
*H04N 5/232* (2006.01)
*G06K 9/46* (2006.01)

(52) U.S. Cl.
CPC ............. *G06T 2207/20021* (2013.01); *G06T 2207/20112* (2013.01); *G09G 2310/08* (2013.01); *G09G 2370/02* (2013.01)

(56) References Cited

U.S. PATENT DOCUMENTS

| | | | |
|---|---|---|---|
| 2003/0026588 A1* | 2/2003 | Elder | G08B 13/19643 386/230 |
| 2003/0053658 A1* | 3/2003 | Pavlidis | G06K 9/00335 382/103 |
| 2004/0032495 A1* | 2/2004 | Ortiz | H04N 5/232 348/157 |
| 2004/0086186 A1* | 5/2004 | Kyusojin | H04N 5/23238 382/232 |
| 2004/0102713 A1 | 5/2004 | Dunn | |
| 2008/0002964 A1* | 1/2008 | Edwards | G03B 13/02 396/374 |
| 2010/0056274 A1 | 3/2010 | Uusitalo et al. | |
| 2012/0105310 A1* | 5/2012 | Sverdrup | G02B 27/017 345/8 |
| 2013/0141523 A1* | 6/2013 | Banta | H04N 5/23238 348/36 |
| 2013/0266065 A1* | 10/2013 | Paczkowski | H04N 21/4728 375/240.12 |
| 2014/0123162 A1* | 5/2014 | Karlsson | H04N 21/4331 725/12 |
| 2014/0146394 A1 | 5/2014 | Tout et al. | |
| 2015/0312264 A1 | 10/2015 | Ortiz et al. | |
| 2016/0012855 A1* | 1/2016 | Krishnan | H04N 21/4728 386/241 |

FOREIGN PATENT DOCUMENTS

| | | |
|---|---|---|
| JP | 2000-132673 | 5/2000 |
| JP | 2004-072694 | 3/2004 |
| WO | 2002/093916 A2 | 11/2002 |
| WO | 2006/106371 A1 | 10/2006 |
| WO | WO 2015/134400 A1 | 9/2015 |

OTHER PUBLICATIONS

Vural et al., "Eye-Gaze Based Real-Time Surveillance Video Synopsis", Journal Pattern Recognition Letters, vol. 30, No. 12, Sep. 2009, pp. 1-18.
"VR Player", Codeplex, Retrieved on Jul. 28, 2016, Webpage available at : https://vrplayer.codeplex.com/.
Zha et al., "Dynamic Gaze-Controlled Levels Of Detail of Polygonal Objects In 3-D Environment Modeling", Proceedings Second International Conference on 3-D Digital Imaging and Modeling, 1999, pp. 321-330.
"Smooth Streaming", Microsoft, Retrieved on Aug. 4, 2016, Webpage available at : http://www.iis.net/downloads/microsoft/smooth-streaming.
"Scalable Video Coding", Wikipedia, Retrieved on Aug. 4, 2016, Webpage available at : https://en.wikipedia.org/wiki/Scalable_Video_Coding.
"Bubl's 360-Degree Camera Records Street View-Like Spherical Footage (video)", Engadget, Retrieved on Jul. 28, 2016, Webpage available at : https://www.engadget.com/2013/11/05/bublcam-360-degree-camera/.
"YouTube Is Almost Ready to Take Your 360-Degree Videos", Engadget, Retrieved on Jul. 28, 2016, Webpage available at : https://www.engadget.com/2015/01/05/youtube-360-degree-video-support/.
Search Report received for corresponding United Kingdom Patent Application No. 1503682.5, dated Jul. 16, 2015, 6 pages.
Extended European Search Report received for corresponding European Patent Application No. 16157761.4, dated Jun. 16, 2016, 6 pages.
Office Action for corresponding Japanese Application No. 2016-036694, dated Jul. 26, 2017, 5 pages.
Office Action for corresponding Japanese Application No. 2016-036694 dated May 23, 2017, 9 pages.
Office Action for corresponding European Application No. 16157761.4 dated Dec. 12, 2017, 7 pages.
Office Action for corresponding Chinese Application No. 201610125689.X dated Jul. 4, 2018 with English Summary, 8 pages.
Office Action for corresponding Japanese Application No. 2016-036694, Patent No. 6239018 dated Aug. 6, 2018 with English Summary, 10 pages.
Office Action for European Application No. 16 157 761.4 dated May 20, 2919, 4 pages.
Next-generation video encoding techniques for 360 video and VR [online] [retrieved Jun. 20, 2019]. Retrieved from the Internet: <URL: https://code.fb.com/virtual-reality/next-generation-video-encoding-techniques-for-360-video-and-vr/>. (dated Jan. 21, 2016) 6 pages.

* cited by examiner

VIDEO STREAMING METHOD

BACKGROUND

The multimedia technology has improved markedly during the recent years. For example, it is possible to stream media over a network. This means, that multimedia, for example a video, is received by a user and presented to the user at the same time.

It is noted that streaming videos with high resolution over a network imposes large bandwidth requirements. Therefore, solutions are needed to improve the streaming.

SUMMARY

Now there has been invented an improved method and technical equipment implementing the method, by which the above problems are alleviated. Various aspects of the invention include a method, an apparatus, and a computer readable medium comprising a computer program stored therein, which are characterized by what is stated in the independent claims. Various embodiments of the invention are disclosed in the dependent claims.

The non-limiting examples described here are related to streaming an ultra-high-definition panoramic video into a head-worn display. Streaming ultra-high-definition video over a network imposes large bandwidth requirements. In some streaming situations, it is not necessary to utilize the full resolution of the video content. For example, in streaming of a panoramic video with a wide field of view, the user's attention is usually focused in a part or a sub-section of the video at a time. Thus, it is proposed herein an adaptive streaming method, wherein the part of the field of view the user is currently viewing may be streamed in higher resolution than the part that is outside of the current field of view. This kind of streaming may provide ways to save bandwidth.

According to a first aspect, there is provided a streaming method, comprising receiving a panoramic video, receiving head-tracking data, determining a current field of view based on the head-tracking data, adjusting resolution of the panoramic video based on the current field of view, wherein resolution of the current field of view is a first resolution and the resolution outside of the current field of view is a second resolution, and providing the panoramic video with adjusted resolution, wherein the first resolution is higher than the second resolution. Alternatively or in addition, it may be possible to predict where the user will be watching in the near future, and adapt the resolution of the predicted field of view accordingly.

According to an embodiment, the method further comprises determining a predicted field of view based on the head-tracking data, adjusting resolution of the panoramic video based on the predicted field of view, wherein resolution of the predicted field of view is a third resolution, and providing the panoramic video with adjusted resolution, wherein the third resolution is lower than the first resolution and higher than the second resolution.

According to an embodiment, the method further comprises splitting the panoramic video into two or more sub-streams, wherein at least one sub-stream resides in the current field of view, and at least one sub-stream resides outside of the current field of view, adjusting resolution of the at least one sub-stream residing outside of the current field of view, and providing the panoramic video with adjusted resolution, wherein the adjusted resolution of the at least one sub-stream residing in the current field of view is higher than the adjusted resolution of the at least one sub-stream residing outside of the current field of view.

According to an embodiment, the method further comprises determining at least one sub-stream residing in the predicted field of view, and adjusting resolution of the at least one sub-stream residing in the predicted field of view, wherein the adjusted resolution of the at least one sub-stream residing in the predicted field of view is higher than the adjusted resolution of the at least one sub-stream residing outside of the current and the predicted fields of view and lower than the at least one sub-stream residing in the current field of view.

According to an embodiment, the method further comprises determining a confidence of the head-tracking data, and scaling the resolution of the panoramic video based on the confidence of the head-tracking data.

According to an embodiment, the method further comprises receiving gaze-tracking data in or along the head-tracking data, and performing said scaling based on the gaze-tracking data.

According to an embodiment, the method further comprises determining video stream latency information, and controlling dimensions of the predicted field of view based on the video stream latency information.

According to an embodiment, the method further comprises streaming the panoramic video into a head-mounted display.

According to an embodiment, the method further comprises streaming the panoramic video into a mobile device.

According to an embodiment the method further comprises receiving gaze-tracking data, determining a current focus area based on the gaze-tracking data, adjusting resolution of the panoramic video based on the current focus area, wherein resolution of the current focus area is a fourth resolution and the resolution outside of the current focus area is a fifth resolution, and providing the panoramic video with adjusted resolution, wherein the fourth resolution is higher than the fifth resolution.

According to an embodiment, the method further comprises determining a predicted focus area based on the gaze-tracking data, adjusting resolution of the panoramic video based on the predicted focus area, wherein resolution of the predicted focus area is a sixth resolution, and providing the panoramic video with adjusted resolution, wherein the sixth resolution is lower than the fourth resolution and higher than the fifth resolution.

According to an embodiment, the method further comprises splitting the panoramic video into two or more sub-streams, wherein at least one sub-stream resides in the current focus area, and at least one sub-stream resides outside of the current focus area, adjusting resolution of the at least one sub-stream residing outside of the current focus area, and providing the panoramic video with adjusted resolution, wherein the adjusted resolution of the at least one sub-stream residing in the current focus area is higher than the adjusted resolution of the at least one sub-stream residing outside of the current focus area.

According to an embodiment, the method further comprises determining at least one sub-stream residing in the predicted focus area, and adjusting resolution of the at least one sub-stream residing in the predicted focus area, wherein the adjusted resolution of the at least one sub-stream residing in the predicted focus area is higher than the adjusted resolution of the at least one sub-stream residing outside of the current and the predicted focus areas and lower than the at least one sub-stream residing in the current focus area.

According to an embodiment, the method further comprises determining a confidence of the gaze-tracking data, and scaling the resolution of the panoramic video based on the confidence of the gaze-tracking data.

According to a second aspect, there is provided an apparatus comprising means for receiving a panoramic video, means for receiving head-tracking data, means for determining a current field of view based on the head-tracking data, means for adjusting resolution of the panoramic video based on the current field of view, wherein resolution of the current field of view is a first resolution and the resolution outside of the current field of view is a second resolution, and means for providing the panoramic video with adjusted resolution, wherein the first resolution is higher than the second resolution.

These and other aspects of the invention and the embodiments related thereto will become apparent in view of the detailed disclosure of the embodiments further below.

DESCRIPTION OF THE DRAWINGS

In the following, various embodiments of the invention will be described in more detail with reference to the appended drawings, in which.

DETAILED DESCRIPTION

In the following, several embodiments of the invention will be described in the context of video streaming, in particular streaming of ultra-high-definition panoramic video into a head-mounted display. It is to be noted, however, that the invention is not limited to such implementations. In fact, different embodiments have applications in any environment where video streaming is required.

Figure 1A:
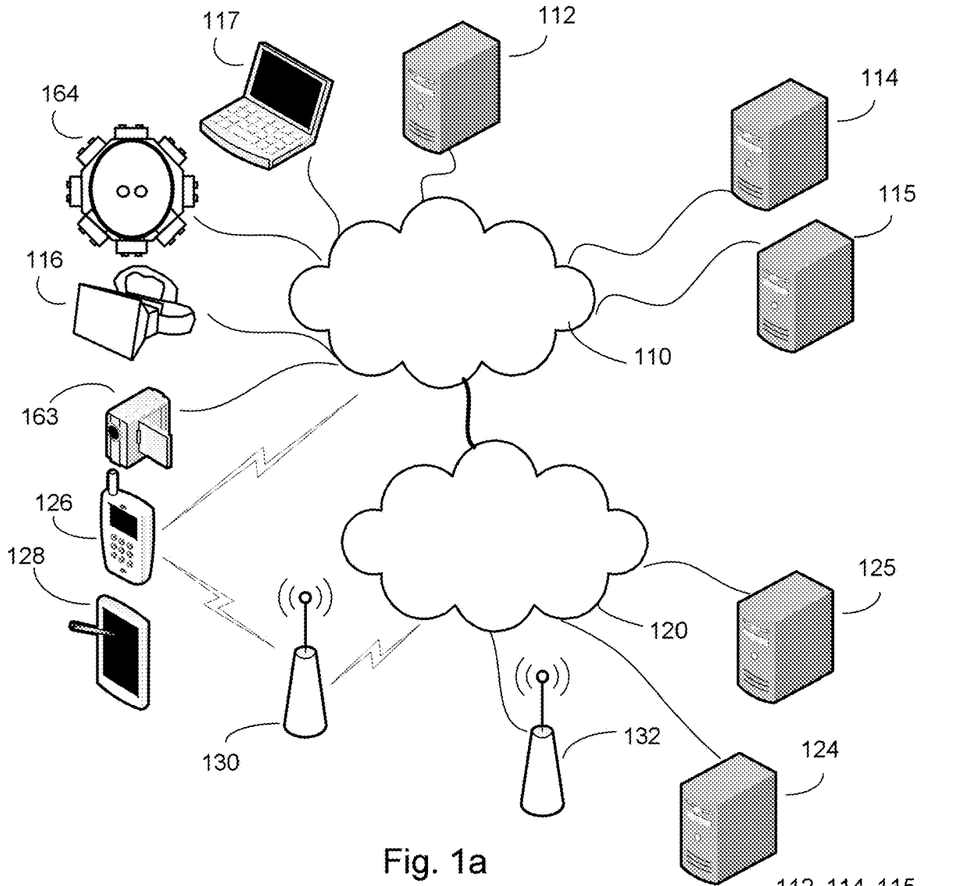
FIGS. 1a, 1b and 1c show examples of a communication arrangement with a server system, communication networks and user devices, and block diagrams for a server and user devices.

FIG. 1a shows a system and devices for processing images. In FIG. 1a, the different devices may be connected via a fixed wide area network such as the Internet 110, a local radio network or a mobile communication network 120 such as the Global System for Mobile communications (GSM) network, 3rd Generation (3G) network, 3.5th Generation (3.5G) network, 4th Generation (4G) network, 5th Generation network (5G), Wireless Local Area Network (WLAN), Bluetooth®, or other contemporary and future networks. Different networks are connected to each other by means of a communication interface, such as that between the mobile communication network 120 and the Internet 110 in FIG. 1a. The networks comprise network elements such as routers and switches to handle data (not shown), and radio communication nodes such as the base stations 130 and 132 for providing access for the different devices to the network, and the base stations 130, 132 are themselves connected to the mobile communication network 120 via a fixed connection or a wireless connection.

There may be a number of servers connected to the network, and in the example of FIG. 1a are shown servers 112, 114 for offering a network service for processing images to be shared to other users, for example, a social media service, and a database 115 for storing images and/or videos and information for processing the images and/or videos, and connected to the fixed network (Internet) 110. There are also shown a server 124 for offering a network service for streaming video image, for example, and a database 125 for storing video and information for streaming the video. The server 124 and the database 125 may be connected to the mobile network 120. Some of the above devices, for example the computers 112, 114, 115 may be such that they make up the Internet with the communication elements residing in the fixed network 110.

There may also be a number of user devices such as head-mounted display devices 116, mobile phones 126 and smart phones, Internet access devices 128, personal computers 117 of various sizes and formats, and cameras and video cameras 163 and 3D video cameras 164. These devices 116, 117, 126, 128, 163 and 164 may also be made of multiple parts. The various devices may be connected to the networks 110 and 120 via communication connections such as a fixed connection to the internet 110, a wireless connection to the internet 110, a fixed connection to the mobile network 120, and a wireless connection to the mobile network 120. The connections are implemented by means of communication interfaces at the respective ends of the communication connection.

In this context, a user device may be understood to comprise functionality and to be accessible to a user such that the user can control its operation directly. For example, the user may be able to power the user device on and off. The user may also be able to move the device. In other words, the user device may be understood to be locally controllable by a user (a person other than an operator of a network), either directly by pushing buttons or otherwise physically touching the device, or by controlling the device over a local communication connection such as Ethernet, Bluetooth or WLAN.

Figure 1B:
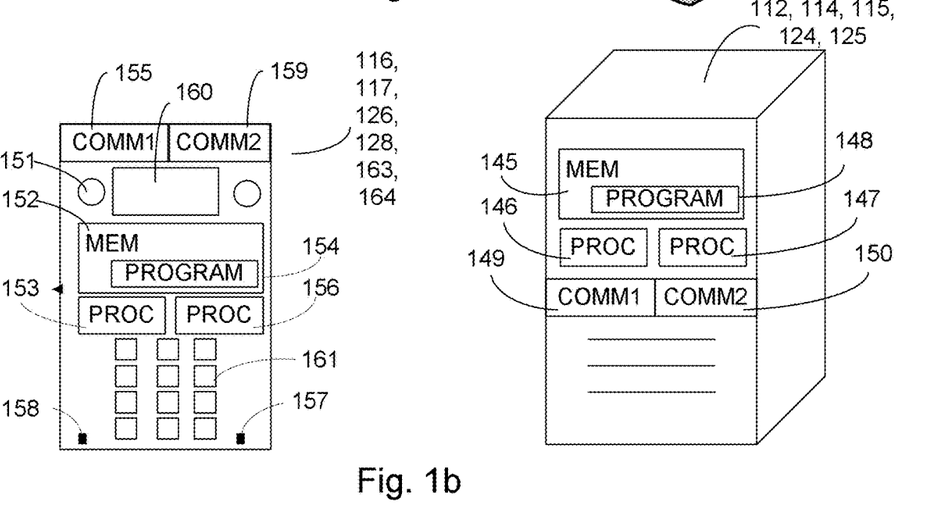

As shown in FIG. 1b, a user device 116, 117, 126, 128, 163 and 164 may contain memory MEM 152, at least one processor PROC 153, 156, and computer program code PROGRAM 154 residing in the memory MEM 152 for implementing, for example, image processing. The user device may also have one or more cameras 151 for capturing image data, for example video. The user device may also contain one, two or more microphones 157, 158 for capturing sound. It may be possible to control the user device using the captured sound by means of audio and/or speech control. The different user devices may contain the same, fewer or more elements for employing functionality relevant to each device. The user devices may also comprise a display 160 for viewing a graphical user interface, and buttons 161, touch screen or other elements for receiving user input. The user device may also comprise communication modules COMM1 155, COMM2 159 or communication functionalities implemented in one module for communicating with other devices.

FIG. 1b shows also a server device for providing image processing and storage. As shown in FIG. 1b, the server 112, 114, 115, 124, 125 contains memory MEM 145, one or more processors PROC 146, 147, and computer program code PROGRAM 148 residing in the memory MEM 145 for implementing, for example, video streaming. The server may also comprise communication modules COMM1 149, COMM2 150 or communication functionalities implemented in one module for communicating with other devices. The different servers 112, 114, 115, 124, 125 may contain these elements, or fewer or more elements for employing functionality relevant to each server. The servers 115, 125 may comprise the same elements as mentioned, and a database residing in a memory of the server. Any or all of the servers 112, 114, 115, 124, 125 may individually, in groups or all together process and store images. The servers may form a server system, e.g. a cloud.

Figure 1C:
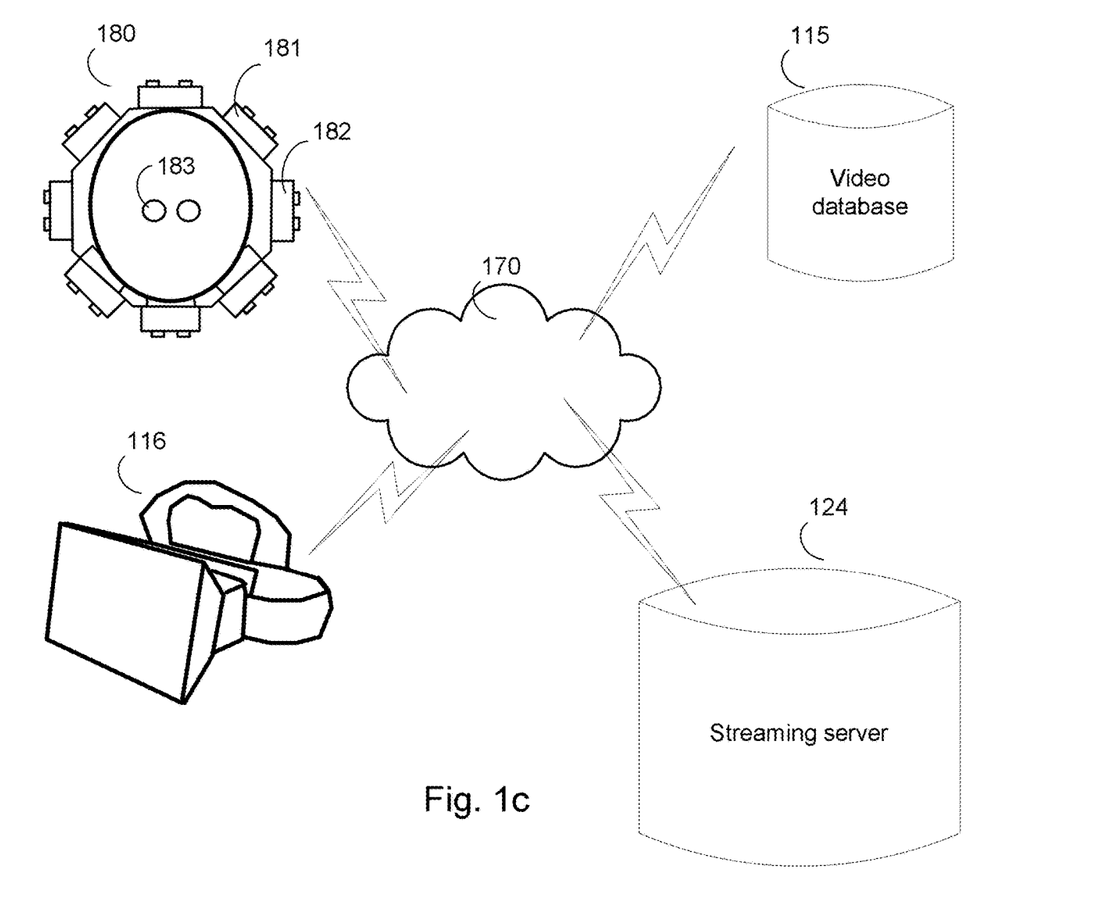

FIG. 1c shows an example of a system and devices for video image capturing and video streaming. In FIG. 1a, the different devices may be connected via a communication connection 170, for example via internet, a local radio network or a mobile communication network. Different networks may be connected to each other by means of a communication interface. A multi-camera device 180, which is viewed from top-down perspective in FIG. 1c, may be mounted to a user's head or may be supported by a tripod, for example. The device 180 may be used to acquire panoramic video, i.e. video with a wide field of view, for example 3D 360° video image. The term panoramic may not be understood as some specific number of degrees. An aspect ratio defines the relationship between the width and the height of an image. Both the aspect ratio and the field of view are factors in defining a panoramic video image. Usually, panoramic may be understood as an elongated image being at least twice as wide as it is high. The multi-camera device 180 may comprise several cameras, for example cameras 181, 182, 183, that are located so that video image may be acquired from every direction. There may be cameras located around the head of a user, for example cameras 181 and 182. In addition, there may be cameras directing heavenward, and located on top of the user's head, for example camera 183. In addition, there may be cameras directing downward (not shown). Alternatively, the cameras of the multi-camera device may be mounted on a pole, a stand, a tripod or some other suitable mount. The panoramic video acquired using the multi-camera device 180 may be stored in a video database 115. Alternatively, it may be sent to a streaming server 124 via communication connection. The streaming server 124 may send or stream the video image into a head-mounted display device 116 which may be used to view the video image. Alternatively, the video image may be sent to a mobile device or some other device which may be used to view the video image.

The panoramic video may be ultra-high-definition video received in a server, for example the streaming server 124. The panoramic video may be received from the video database 115. There may be panoramic movies stored in the video database 115, where the panoramic videos may be retrieved from. Alternatively, the panoramic video may be received in the streaming server from a video camera, i.e. it may be live video acquired using the multi-camera device 180, or other kind of a 3D 360° video camera. The head-mounted camera device may be integrated into the head-mounted display 116. The live video acquired using the multi-camera device 180 may be streamed in real time by the streaming server 124 into the head-mounted display 116.

The head-mounted display 116 is a wearable device that creates a display in front of the user's field of view. For example, the user may view a video image through the head-mounted display 116. The head-mounted display may have a property of being at least partially transparent, and it may have adjustable see-through capabilities. When the user is viewing the panoramic video through the head-mounted display 116, the user's field of view may be limited. For example, it may be 90°, 100°, or 110°, or some other number of degrees.

Head-tracking data may be used to detect user's viewing direction. Head-tracker may be integrated in to a head-mounted display 116. Head orientation and head movement may be tracked using a combination of 3-axis rotational tracking and 3-axis positional tracking, for example. There may be gyroscopes, accelerometers, and magnetometers integrated in to a head-mounted display 116 which may be used in head-tracking. Alternatively, the head-tracker may be a separate device worn by the user, and the acquired head-tracking data may be sent to the streaming server 124 through a communication connection.

Sometimes it may be worthwhile to stream the ultra-high-definition panoramic video in its original resolution. In some situations, however, it may be useful to use adaptive streaming of the panoramic video. For example, if the user is viewing the panoramic video through a head-mounted display, the user may not see the whole 360° video simultaneously. In this kind of cases, it may be useful to carry out adaptive streaming, and stream the part of the field of view the user is currently viewing in higher resolution than the part that is outside of the current field of view. This may be carried out using head-tracking data.

Figure 2:
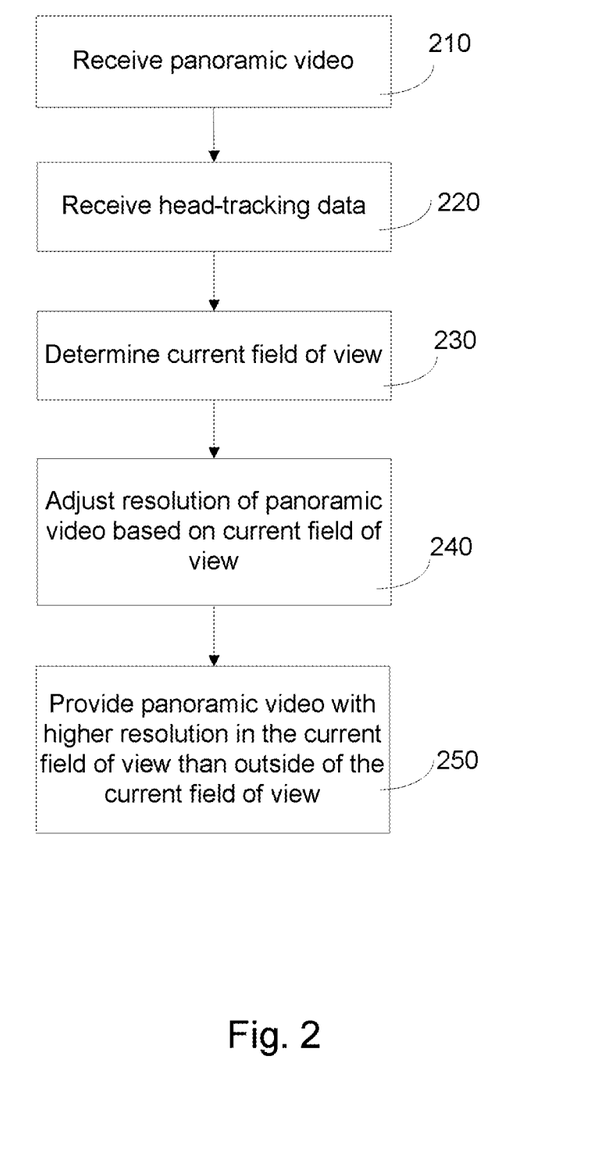
FIG. 2 shows a flowchart of an example of a video streaming method.

FIG. 2 shows a flowchart of a video streaming method according to an aspect. In the method, a panoramic video is received 210, for example in a server, such as a streaming server. Head-tracking data is also received 220, for example from a head-mounted display unit. A current field of view is determined 230 based on the head-tracking data, and resolution of the panoramic video is adjusted 240 based on the current field of view, wherein resolution of the current field of view is a first resolution and the resolution outside of the current field of view is a second resolution. Then, the panoramic video with adjusted resolution is provided 250, wherein the first resolution is higher than the second resolution.

In other words, the panoramic video and the head-tracking data may be received in the streaming server 124. A current field of view of a user who is viewing the video using a head-mounted display may be determined based on the head-tracking data. The resolution of the panoramic video may be adjusted based on the current field of view. The video image falling under the current field of view may be streamed in high resolution, for example in the original resolution of the ultra-high-definition video. The video image falling outside of the current field of view may be streamed in lower resolution. The panoramic video with adjusted resolution may be streamed into a head-mounted display, for example. This kind of a streaming method saves bandwidth, since bandwidth is not used unnecessarily by transmitting high-quality content outside of the user's current field of view.

According to an embodiment, the method may further comprise: determining a predicted field of view based on the head-tracking data; adjusting resolution of the panoramic video based on the predicted field of view, wherein resolution of the predicted field of view is a third resolution; and providing the panoramic video with adjusted resolution, wherein the third resolution is lower than the first resolution and higher than the second resolution.

The head-tracking data may be used to predict view motion in the near future. Angular speed of the user's head and variance thereof may be measured, and then it may be possible to estimate where the user's head will likely be pointing after a short time. For example, if the angular speed of the user's head remains mostly constant, it may be estimated where the user's head will be pointing after a certain time.

Thus, the video image falling in the predicted field of view may be streamed in medium resolution, the video image falling in the current field of view may be streamed in high resolution, and the video image falling outside of the current and the predicted fields of view may be streamed in low resolution. Since the video image falling in the predicted field of view, that is expected to become visible, may start to stream in medium resolution, it compensates for possible delays in the streaming system. In addition to the high resolution stream and the medium resolution stream, the low resolution stream may also be sent from the server to a head-mounted display, for example. In case the user's head is turned unexpectedly, it may be possible to show the low resolution stream to the user until the head is stable again.

Ultra-high-definition video may be 4K Ultra HD, or 8K Ultra HD, or some other format. Medium resolution and low resolution may be, for example, 40-60%, preferably 50%, and 20-30%, preferably 25%, of the full resolution, respectively. The resolutions may be set in user settings, and the values may vary. The resolution may be matched to the resolution of human eye. For example, the low resolution may be matched to the resolution of human peripheral vision.

According to an embodiment, the video streaming method may further comprise splitting the panoramic video into two or more sub-streams, wherein at least one sub-stream resides in the current field of view, and at least one sub-stream resides outside of the current field of view. The resolution of the at least one sub-stream residing outside of the current field of view may be adjusted. The panoramic video with adjusted resolution may be provided, wherein the adjusted resolution of the at least one sub-stream residing in the current field of view is higher than the adjusted resolution of the at least one sub-stream residing outside of the current field of view. The sub-streams may be used in video streaming, when the resolution or, for example, the frame rate of the video, is too high for the available bandwidth. Reducing the resolution of the sub-stream(s) residing outside of the current field of view may further save bandwidth.

Figure 3A:
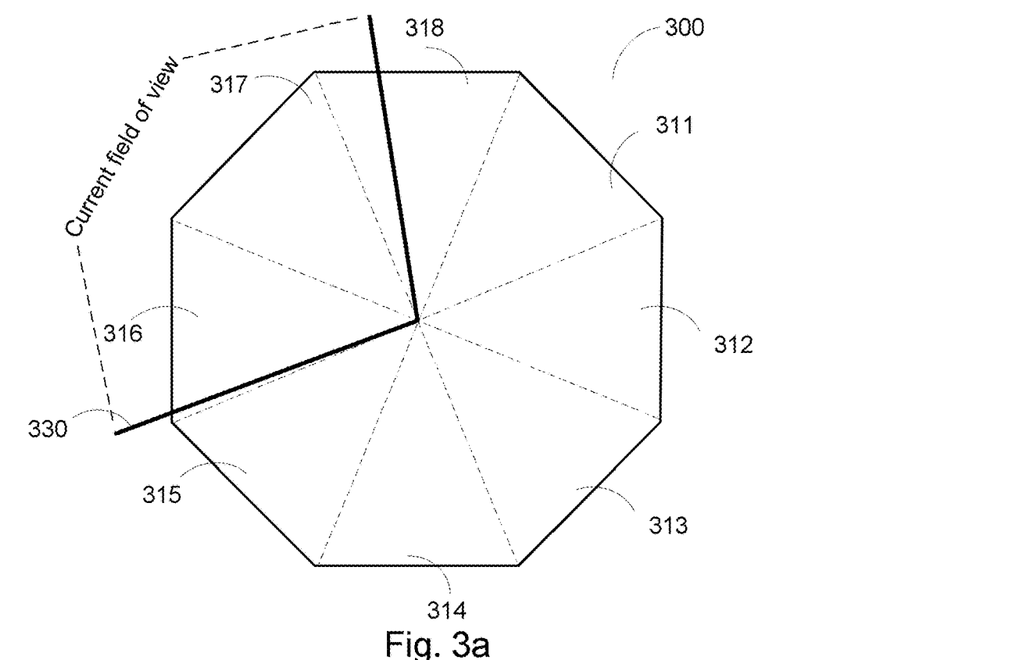
FIGS. 3a, 3b, 3c and 3d show examples of fields of view and sub-streams, and focus areas.

FIG. 3a shows an example of a field of view and sub-streams. Video sub-streams may be generated in the streaming server. A 360° sphere 300 of the panoramic video received from the video database may be split into sub-streams, each covering some parts of the full 360° sphere 300. For example, the panoramic video may be split into eight sub-streams 311, 312, 313, 314, 315, 316, 317, 318 each covering a view of 45°. The current field of view which is marked with a solid line 330 in FIG. 3a may be determined based on the head-tracking data. For example, the sub-streams 316, 317, 318 residing, at least partly, in the current field of view may be streamed in high resolution. The sub-streams 311, 312, 313, 314, 315 may be streamed in low resolution.

It may be that a sub-stream resides partly in the current field of view and partly outside of the current field of view. In this case, the sub-stream may be streamed in higher resolution. For example, sub-streams 316 and 318 that reside partly in the current field of view may be streamed in higher resolution. This means that if a high number of sub-streams is used, less high-resolution video image remain outside of the current field of view.

Figure 3B:
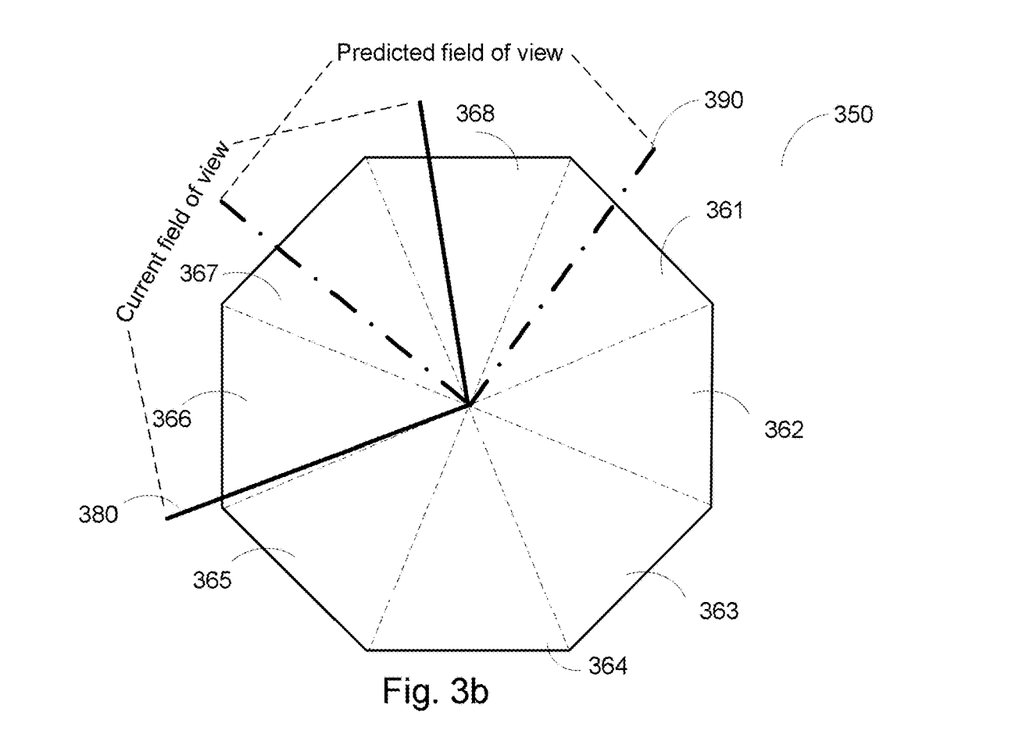

The number of sub-streams is not relevant as long as there will be at least two sub-streams. For example, there may be one sub-stream in the current field of view and one sub-stream outside of the current field of view. The panoramic video may be split into any number of sub-streams, provided that the number of sub-streams is at least two. The examples in FIG. 3a and FIG. 3b are two-dimensional examples of using sphere mapping. There exist also other types of reflection mapping, for example cube mapping, pyramid mapping, and HEALPix mapping that can be used in implementation of the video streaming method. The number of sub-streams may depend on the implementation.

According to an embodiment, the video streaming method may comprise determining at least one sub-stream residing in the predicted field of view and adjusting resolution of the at least one sub-stream residing in the predicted field of view, wherein the adjusted resolution of the at least one sub-stream residing in the predicted field of view is higher than the adjusted resolution of the at least one sub-stream residing outside of the current and the predicted fields of view and lower than the at least one sub-stream residing in the current field of view.

FIG. 3b shows an example of fields of view and sub-streams. The video sub-streams may be generated in the streaming server. A 360° sphere 350 of the panoramic video received from the video database may be split into sub-streams, each covering some parts of the full 360° sphere 350. For example, the panoramic video may be split into eight sub-streams 361, 362, 363, 364, 365, 366, 367, 368 each covering a view of 45°. The current field of view which is marked with a solid line 380 in FIG. 3b may be determined based on the head-tracking data. For example, the sub-streams 366, 367, 368 residing, at least partly, in the current field of view may be streamed in high resolution. The predicted field of view which is marked with a dot-dash line 390 in FIG. 3b may be determined based on the head-tracking data, as described above. The sub-stream 361 which is expected to become visible in the near future, may be streamed in medium resolution which is lower than the resolution of the sub-streams 366, 367 and 368 and higher than the resolution of the sub-streams 362, 363, 364 and 365 residing outside of the current field of view and the predicted field of view. The sub-streams 362, 363, 364 and 365 may be streamed in low resolution.

According to an embodiment, the video streaming method may comprise determining a confidence of the head-tracking data and scaling the resolution of the panoramic video based on the confidence of the head-tracking data. This way it may be possible to save the bandwidth, since high-quality video is not streamed in vain. The scaling may comprise reducing the first resolution if the confidence of the head-tracking data is low, and increasing the first resolution if the confidence of the head-tracking data is high. In other words, the resolution of the sub-streams residing in the estimated current field of view may be scaled or adjusted based on the confidence of the view prediction.

Confidence of the head-tracking data may be considered high if the angular velocity of the user's head remains more or less constant over a certain time interval. If the user's head is moving erratically, i.e. the confidence of the head-tracking data is low, the sub-streams residing in the current field of view may be streamed in reduced resolution. When the head motion is stable enough, i.e. the confidence of the head-tracking data is high, the streaming resolution is adapted and the sub-streams residing in the current field of view may be streamed in high resolution.

Signal processing of the head orientation signal and angular speed signal may comprise filtering, for example low-pass filtering with different cut-off frequencies. Thus, it may be possible to estimate certain trends in the user's head motion. For example, it may be possible to estimate short-term and medium-term trends for view prediction. These trends may be compared, and the similarity between the short-term and medium-term view predictions may be used to estimate the confidence of the view prediction. When the confidence of the view prediction is high, the predicted field of view may be narrower compared to the situation when the confidence of the view prediction is low. Further, the predicted field of view may be streamed in high resolution when the confidence of the predicted field of view is high, and the predicted field of view may be streamed at low resolution when the confidence of the predicted field of view is low. This way it may be possible to account for the uncertainty of the view prediction.

According to an embodiment, the video streaming method may comprise receiving gaze-tracking data in the streaming server in or along the head-tracking data and performing said scaling based on the gaze-tracking data. This way streaming unnecessarily low resolution video may be avoided.

The head-mounted display may comprise a gaze-tracker, for example a camera to be used to track a gaze direction of the user. Gaze-tracking may be used to enhance the view prediction. For example, the user's gaze may be followed, and it may be noticed if the user is locking one's gaze to a specific part of the video while turning one's head. If the user is locking the gaze to specific part of the field of view, and for some reason, is moving the head erratically, the video may still be streamed in high quality, since the user's focus of interest is known.

Alternatively or in addition, scaling resolution based on the gaze-tracking data may save bandwidth. The substreams or areas of the video residing in the edges of the current field of view may be streamed at low resolution, if the user's gaze is focused on a specific part of the video. The part of the video the user's gaze is focused on may be streamed in high resolution.

Figure 3C:
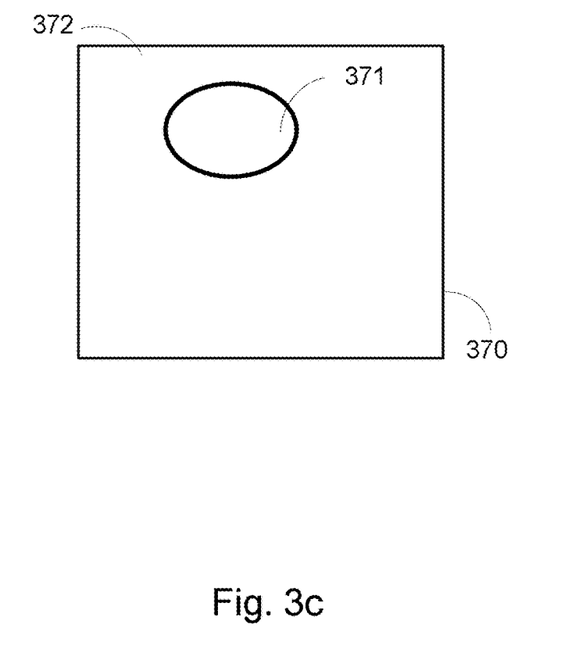

FIG. 3c shows an example of a focus area in the current field of view 370 determined based on the gaze-tracking data. According to an embodiment, the video streaming method may comprise receiving gaze-tracking data and determining a current focus area 371 based on the gaze-tracking data. Resolution of the panoramic video may be adjusted, wherein resolution of the current focus area 371 is a fourth resolution and the resolution outside 372 of the current focus area is a fifth resolution. The panoramic video with adjusted resolution may be provided, wherein the fourth resolution is higher than the fifth resolution. Alternatively, the resolution outside 372 of the current focus area 371 may progressively decrease towards to the edges of the field of view 370. The focus area 371 may be of various sizes. For example, the size of the focus area 371 may correspond to the region of sharp vision in the human eye.

Figure 3D:
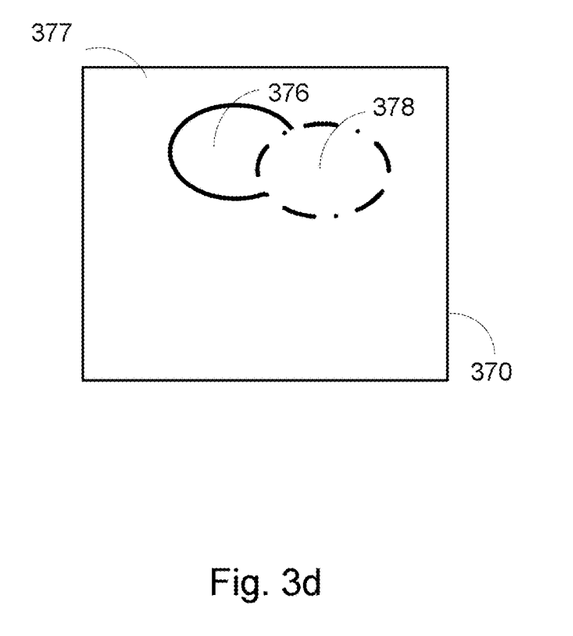

FIG. 3d shows an example of focus areas determined based on the gaze-tracking data. A predicted focus area 378 may be determined based on the gaze-tracking data. Resolution of the panoramic video may be adjusted based on the predicted focus area 378, wherein resolution of the predicted focus area 378 is a sixth resolution. The panoramic video with adjusted resolution may be provided, wherein the sixth resolution is lower than the fourth resolution, i.e. the resolution of the current focus area 376 and higher than the fifth resolution, i.e. the resolution outside 377 of the current and the predicted focus areas. Alternatively, the resolution outside 377 of the current focus area 376 and the predicted focus area 378 may progressively decrease towards to the edges of the field of view 370. The focus areas 376, 378 may be of various sizes and forms. For example, the size of the focus areas 376, 378 may correspond to the region of sharp vision in the human eye.

Trajectory of the gaze may be recorded and be used to create a viewing summary.

According to an embodiment, the video streaming method may comprise determining video stream latency information and controlling dimensions of the predicted field of view based on the video stream latency information. Since the dimension of the predicted field of view may be controlled, sending of unnecessarily high resolution video may be avoided. The dimensions here may comprise spatial and/or temporal dimensions.

Hence, considering video streaming from a server to a display, there may usually be a certain latency i.e. time delay. Video streaming latency information may be determined in the streaming server. The video streaming latency information may be used in controlling dimensions of the predicted field of view. For example, if there is a latency of one second between sending a control command from the display to the streaming server and receiving the video stream, the field of view may be predicted one second into the future. As another example, if the latency is short, it may not be necessary to determine very wide predicted field of view, since the view prediction may adapt rapidly to changes in head motion. If the latency is long, it may be useful to determine a wider predicted field of view. This way, the likelihood that the user's view will end up somewhere inside the predicted field of view may be increased.

A skilled person appreciates that any of the embodiments described above may be implemented as a combination with one or more of the other embodiments, unless there is explicitly or implicitly stated that certain embodiments are only alternatives to each other.

The various examples described above may provide advantages. Bandwidth is saved since the resolution of streamed video is adapted according to the user's viewing direction. The streaming method may provide interactive viewing experience of ultra-high-definition video. It may be possible to share, for example in social media, the panoramic video with the head-tracking data and/or the gaze-tracking data. Thus, another user may play back a viewing experience of the original user.

Figure 4:
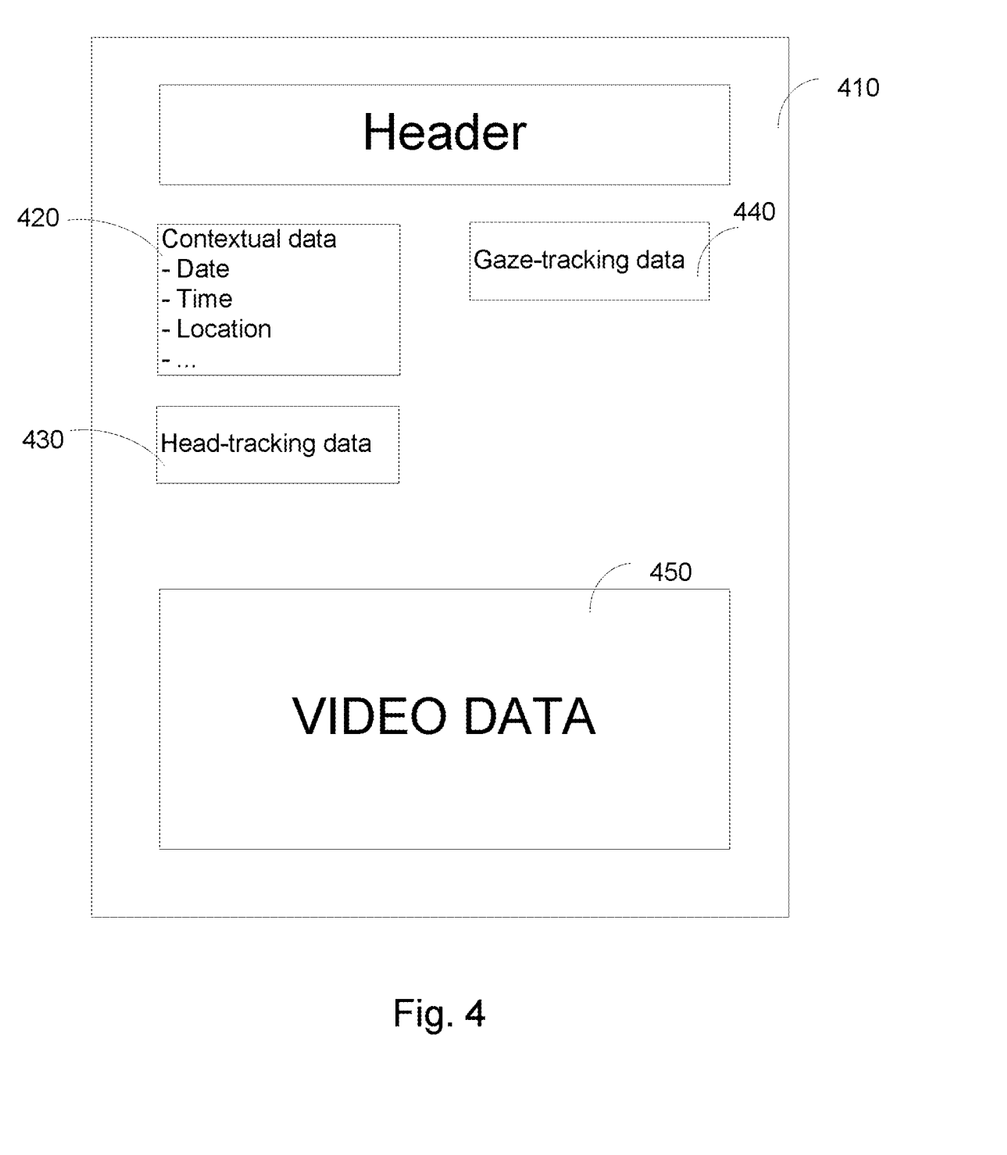
FIG. 4 shows an example of a video image header file.

FIG. 4 shows an example of a video image header file 410. The header file 410 may include contextual data 420, for example, date and time, when the video was captured, and location indicating where the video was captured. The header file 410 may also include the head-tracking data 430 and gaze-tracking data. The video data 450 may be in various formats, for example, WebM, Windows Media Video, Quicktime, AVI, MPEG, Ogg Video or raw video format. In addition, there will be requisites for video coding and decoding.

The various examples described above may be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment.

The embodiments of this invention may be implemented by computer software executable by, for example, a data processor of the server, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, or CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:
    receiving a panoramic video;
    receiving head-tracking data of a user of a head-mounted display;
    determining a current field of view based on the head-tracking data:
    determining a predicted field of view, that is expected to become visible;
    generating three or more sub-streams by splitting the panoramic video into the three or more sub-streams, wherein at least one sub-stream resides in the current field of view, at least one sub-stream resides outside of the current field of view and the predicted field of view, and at least one sub-stream resides in the predicted field of view;
    reducing resolution of the at least one sub-stream residing outside of the current field of view and the predicted field of view and reducing resolution of the at least one sub-stream residing in the predicted field of view; and
    providing for streaming the panoramic video, the panoramic video having the reduced resolution of the at least one sub-stream residing outside of the current field of view and the predicted field of view, and the reduced resolution of the at least one sub-stream residing in the predicted field of view, wherein the resolution of the at least one sub-stream residing in the predicted field of view is lower than the resolution of the at least one sub-stream residing in the current field of view and is higher than the resolution of the at least one sub-stream residing outside of the current field of view and the predicted field of view.

2. The method according to claim 1, further comprising:
    determining a predicted field of view based on the head-tracking data;
    adjusting resolution of the panoramic video based on the predicted field of view, wherein resolution of the predicted field of view is a third resolution; and
    providing the panoramic video with the adjusted resolution based on the predicted field of view, wherein the third resolution is lower than the first resolution and higher than the second resolution.

3. The method according to claim 1, further comprising:
    determining at least one sub-stream residing in the predicted field of view; and
    adjusting resolution of the at least one sub-stream residing in the predicted field of view, wherein the adjusted resolution of the at least one sub-stream residing in the predicted field of view is higher than the adjusted resolution of the at least one sub-stream residing outside of the current field of view and the predicted fields of view and lower than the at least one sub-stream residing in the current field of view.

4. The method according to claim 1, further comprising:
    determining a confidence of the head-tracking data; and
    scaling the resolution of the panoramic video based on the confidence of the head-tracking data.

5. An apparatus comprising at least one processor, and memory including computer program code, the memory and the computer program code configured to, with at least one processor, cause the apparatus to perform at least the following:
    receive a panoramic video;
    receive head-tracking data of a user of a head-mounted display;
    determine a current field of view based on the head-tracking data;
    determine a predicted field of view, that is expected to become visible;
    generate three or more sub-streams by splitting the panoramic video into the three or more sub-streams, wherein at least one sub-stream resides in the current field of view, at least one sub-stream resides outside of the current field of view and the predicted field of view, and at least one sub-stream resides in the predicted field of view;
    reduce resolution of the at least one sub-stream residing outside of the current field of view and the predicted field of view and reduce resolution of the at least one sub-stream residing in the predicted field of view; and
    provide for streaming the panoramic video, the panoramic video having the reduced resolution of the at least one sub-stream residing outside of the current field of view and the predicted field of view, and the reduced resolution of the at least one sub-stream residing in the predicted field of view, wherein the resolution of the at least one sub-stream residing in the predicted field of view is lower than the resolution of the at least one sub-stream residing in the current field of view and is higher than the resolution of the at least one sub-stream residing outside of the current field of view and the predicted field of view.

6. The apparatus according to claim 5, further comprising computer program code, which executed by the at least one processor, causes the apparatus to perform:
    determine a predicted field of view based on head tracking data the head-tracking data;

adjust resolution of the panoramic video based on the predicted field of view, wherein resolution of the predicted field of view is a third resolution; and provide the panoramic video with the adjusted resolution based on the predicted field of view, wherein the third resolution is lower than the first resolution and higher than the second resolution.

7. The apparatus according to claim 6, further comprising computer program code, which executed by the at least one processor, causes the apparatus to perform:

determine video stream latency information; and control dimensions of the predicted field of view based on the video stream latency information.

8. The apparatus according to claim 5, further comprising computer program code, which executed by the at least one processor, causes the apparatus to perform:

determine at least one sub-stream residing in the predicted field of view; and adjust resolution of the at least one sub-stream residing in the predicted field of view, wherein the adjusted resolution of the at least one sub-stream residing in the predicted field of view is higher than the adjusted resolution of the at least one sub-stream residing outside of the current field of view and lower than the at least one sub-stream residing in the current field of view.

9. The apparatus according to claim 5, further comprising computer program code, which executed by the at least one processor, causes the apparatus to perform:

determine a confidence of the head-tracking data; and scale the resolution of the panoramic video based on the confidence of the head-tracking data.

10. The apparatus according to claim 9, further comprising computer program code, which executed by the at least one processor, causes the apparatus to perform:

receive gaze-tracking data in or along the head-tracking data; and perform the scaling based on the gaze-tracking data.

11. The apparatus according to claim 5, further comprising computer program code, which executed by the at least one processor, causes the apparatus to perform:

stream the panoramic video into a mobile device.

12. The apparatus according to claim 5, further comprising computer program code, which executed by the at least one processor, causes the apparatus to perform:

receive gaze-tracking data;

determine a current focus area based on the gaze-tracking data;

adjust resolution of the panoramic video based on the current focus area, wherein resolution of the current focus area is higher than resolution outside of the current focus area; and provide the panoramic video with the adjusted resolution based on the current focus area.

13. The apparatus according to claim 12, further comprising computer program code, which executed by the at least one processor, causes the apparatus to perform:

determine a predicted focus area based on the gaze-tracking data;

adjust resolution of the panoramic video based on the predicted focus area; and provide the panoramic video with the adjusted resolution based on the predicted focus area, wherein resolution of the predicted focus area is lower than the resolution of the current focus area and higher than the resolution outside of the current focus area.

14. The apparatus according to claim 13, further comprising computer program code, which executed by the at least one processor, causes the apparatus to perform:

determine at least one sub-stream residing in the predicted focus area; and adjust resolution of the at least one sub-stream residing in the predicted focus area, wherein the adjusted resolution of the at least one sub-stream residing in the predicted focus area is higher than the adjusted resolution of the at least one sub-stream residing outside of the current and the predicted focus areas and lower than the at least one sub-stream residing in the current focus area.

15. The apparatus according to claim 12, further comprising computer program code, which executed by the at least one processor, causes the apparatus to perform:

split the panoramic video into two or more sub-streams, wherein at least one sub-stream resides in the current field of view, and at least one sub-stream resides outside of the current field of view;

adjust resolution of the at least one sub-stream residing outside of the current field of view;

adjust resolution of the at least one sub-stream residing in the current field of view; and provide the panoramic video with the adjusted resolution of the at least one sub-stream residing in the current field of view and the adjusted resolution of the at least one sub-stream residing outside of the current field of view, wherein the adjusted resolution of the at least one sub-stream residing in the current field of view is higher than the adjusted resolution of the at least one sub-stream residing outside of the current field of view.

16. The apparatus according to claim 12, further comprising computer program code, which executed by the at least one processor, causes the apparatus to perform:

determine a confidence of the gaze-tracking data; and scale the resolution of the panoramic video based on the confidence of the gaze-tracking data.

17. The apparatus according to claim 13, further comprising computer program code, which executed by the at least one processor, causes the apparatus to perform:

determine video stream latency information; and control dimensions of the predicted focus area based on the video stream latency information.

18. A computer program product embodied on a non-transitory computer readable medium, comprising computer program code configured to, when executed on at least one processor, cause an apparatus to perform:

receive a panoramic video;

receive head-tracking data of a user of a head-mounted display;

determine a current field of view based on the head-tracking data;

determine a predicted field of view, that is expected to become visible;

generate three or more sub-streams by splitting the panoramic video into three or more sub-streams, wherein at least one sub-stream resides in the current field of view, at least one sub-stream resides outside of the current field of view and the predicted field of view, and at least one sub-stream resides in the predicted field of view;

reduce resolution of the at least one sub-stream residing outside of the current field of view and the predicted field of view and reduce resolution of the at least one sub-stream residing in the predicted field of view; and provide for streaming the panoramic video, the panoramic video having the reduced resolution of the at least one sub-stream residing outside of the current field of view and the predicted field of view, and the reduced resolution of the at least one sub-stream residing in the predicted field of view, wherein the resolution of the at least one sub-stream residing in the predicted field of view is lower than the resolution of the at least one sub-stream residing in the current field of view and is higher than the resolution of the at least one su b-stream residing outside of the current field of view and the predicted field of view.

\* \* \* \* \*